C. Hand,
Water Wheel.
Nº 4,517. Patented May 16, 1846.

UNITED STATES PATENT OFFICE.

CHRISTOPHER HAND, OF PORT ELIZABETH, NEW JERSEY.

WATER-WHEEL.

Specification of Letters Patent No. 4,517, dated May 16, 1846.

*To all whom it may concern:*

Be it known that I, CHRISTOPHER HAND, of Port Elizabeth, in the county of Cumberland and State of New Jersey, have invented a new and useful Improvement in Water-Wheels, and that the following is a full, clear, and exact description of the principle or character thereof, which distinguishes it from all other things before known, and of the manner of making, constructing, and using the same, reference being had to the accompanying drawings, making part of this specification, in which—

Figure 2:
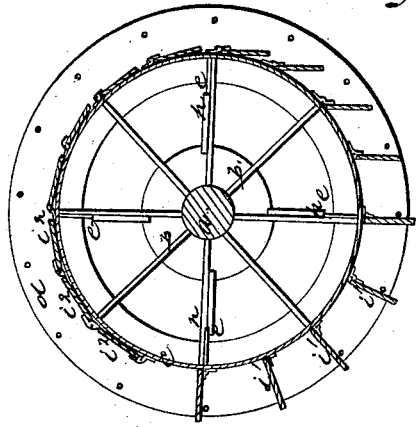
Figure 1:
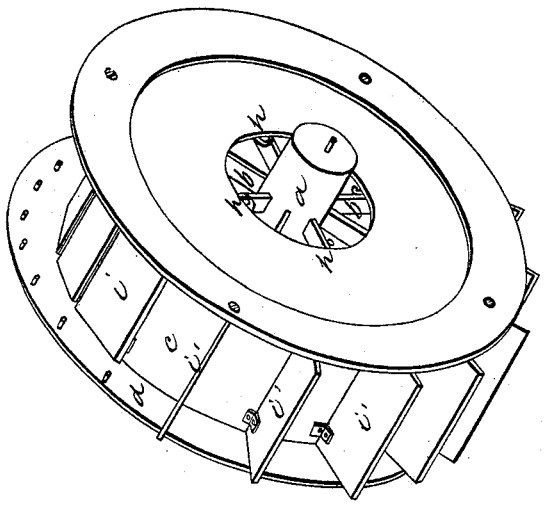

Figure 1 is a perspective view of the wheel, and Fig. 2, a vertical section thereof.

The same letters indicate like parts in all the figures.

The nature of my invention consists in constructing a wheel with hinged folding buckets, the outer edges of which are supported, when thrown out, by stops or flanches projecting from the inside of the rim that extends out on each side of the wheel and incloses the buckets, the inside being furnished with a baling apparatus for freeing the wheel from water that may chance to leak in through the shrouding.

Figure 3:
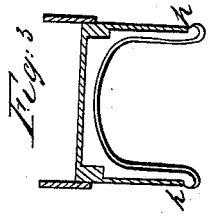

The construction is as follows: The wheel is formed of an axle ($a$) and arms ($b$) inclosed around the periphery by a shrouding or soling ($c$) for the buckets; this should be as nearly tight as practicable to avoid leakage. On each side of this soling there is a rim ($d$) that projects beyond the shrouding equal to the depth of the bucket; this rim also extends inward toward the axle a sufficient distance to prevent the water from flowing into the wheel, when working in slack water. At proper intervals around the inside of the wheel and attached to the inner periphery of the soling, and to the arms scoops ($e$) for the purpose of catching water which may leak through, and discharge it by means of spouts ($h$) leading from each end of the scoops along the inside of the rim to the inner edge of it where they are turned outward (one of these scoops is shown detached at Fig. 3. It will be readily perceived that by this means the inside of the wheel is constantly freed from water. The buckets ($i$) are hinged to the soling and stand out nearly in a radial line, when acted upon by the water and are supported by the stops projecting from the inside of each rim in the position ($i'$, $i'$, $i'$) of Fig. 2, and when they have passed a vertical line from the shaft, they fall over on the soling as at ($i^2$, $i^2$, $i^2$) when they would make backwater, if attached in the usual manner, the wheel being used as a breast or current wheel.

It will be obvious that the wheel will float wholly or in part and thus avoid much of the friction which otherwise would take place in consequence of the weight of the wheel; and also that the rims on each side of the buckets confine the water and therefore renders this wheel applicable as a breast wheel.

What I claim as my invention and desire to secure by Letters Patent is—

The employment of buckets hinged on the edge next the soling in combination with a wheel having rims projecting from the periphery to confine the water to the buckets, as herein described, and I also claim providing such a wheel with scoops for the purpose of discharging such water as may leak through, as described.

CHRISTOPHER HAND.

Witnesses:
 JNO. K. TOWNSEND,
 RICHARD C. HOLMES.